United States Patent [19]
Henoch et al.

[11] Patent Number: 6,106,236
[45] Date of Patent: Aug. 22, 2000

[54] FLUID CONDUIT

[75] Inventors: Charles W. Henoch, Providence; Peter J. Hendricks, Portsmouth, both of R.I.

[73] Assignee: The United States of America as represented by the Secretary of the Navy, Washington, D.C.

[21] Appl. No.: 09/285,182

[22] Filed: Mar. 25, 1999

[51] Int. Cl.[7] .......................... H02K 44/00; G21D 7/02
[52] U.S. Cl. .............................................. 417/50; 310/11
[58] Field of Search .............................. 417/48, 49, 50; 310/11; 244/205; 440/6

[56] References Cited

U.S. PATENT DOCUMENTS

| | | | |
|---|---|---|---|
| 4,212,592 | 7/1980 | Olich et al. | 417/50 |
| 4,687,418 | 8/1987 | Gotou et al. | 417/50 |
| 4,809,354 | 2/1989 | Kawashima | 384/114 |
| 4,842,170 | 6/1989 | Vecchio et al. | 222/594 |
| 4,859,885 | 8/1989 | Kliman et al. | 310/11 |
| 4,869,647 | 9/1989 | Aoyama et al. | 415/50 |
| 4,882,514 | 11/1989 | Brynsvold et al. | 310/208 |
| 5,026,681 | 6/1991 | Hed | 505/165 |
| 5,273,465 | 12/1993 | Meng | 440/6 |
| 5,685,698 | 11/1997 | Smoll | 417/50 |
| 5,923,104 | 7/1999 | Haaland et al. | 310/11 |
| 5,993,164 | 11/1999 | Diaz | 417/50 |

*Primary Examiner*—Teresa Walberg
*Assistant Examiner*—Daniel Robinson
*Attorney, Agent, or Firm*—Michael J. McGowan; Robert W. Gauthier; Prithvi C. Lall

[57] ABSTRACT

A fluid conduit for flowing electrically conductive fluids includes an electrically conductive pipe, an electrically conductive rod extending axially through the pipe and centrally thereof, a first power source in electrical communication with the pipe and rod, a solenoidal electromagnet disposed around the pipe and a second power source in electrical communication with the electromagnet. Activation of the first and second power sources creates an electric and a magnetic field, respectively, within the pipe which interact and result in a circumferential force in the flow with consequent reduction in wall friction in the pipe.

10 Claims, 2 Drawing Sheets

FLUID CONDUIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to conduits for fluid flow and is directed more particularly to a conduit for flowing electrically conductive fluid.

(2) Description of the Prior Art

Attempts to reduce flow friction in a pipe have been numerous and varied, and have included additives to the fluid and/or pipe, coating on the pipe, and deformable pipe surfaces. Other approaches have involved the use of mechanical oscillations of the pipe to introduce width-wise or span-wise, force which have been shown to enhance channel flow. However, mechanical oscillations are impractical in most flow situations and require moving parts.

U.S. Pat. No. 4,824,329 to Yamamoto et al. provides an apparatus for controlling the flow of a liquid metal through a conduit. The flow path is located where a magnetic field perpendicularly intersects an electric current and the flow path perpendicularly intersects both the magnetic field and the electric current. The interaction of the electric and magnetic field creates a force parallel to the flow direction so as to apply a braking force to the flow. The electric properties of the fluid vary with temperature such that the braking force is controlled by the temperature of the liquid. As the force is directed parallel to the flow, the device serves essentially as a pump controlling the rate of flow. The device does not reduce flow friction except as related to flow rate.

U.S. Pat. No. 5,437,421 to Nosenchuck et al. provides a complex array of electromagnetic tiles over a surface to control the boundary layer of a fluid traveling over the surface. Each tile generates magnetic and electric fields in the fluid near the surface such that each tile can produce a force normal to the surface. The electric and/or magnetic fields of each tile are individually controlled such that the forces can be made to act separately. The force at each tile is timed to act in opposition to the boundary layer micro-turbulent flow over the tile to thus smooth the flow and reduce surface drag. The complex tile arrangement and control lends itself to flow over an open surface as the tiles could not be readily applied to the inside of a conduit.

There is a need for a fluid conduit wherein wall friction is reduced by span-wise perturbations which are not mechanically induced.

SUMMARY OF THE INVENTION

It is, therefore, an object of the invention to provide a conduit for flowing fluid therethrough and having facility for exercising periodic span-wise forces on the fluid to reduce wall friction.

A further object of the invention is to provide such a conduit for flowing electrically conductive fluid therethrough and having facility for exercising magneto-hydrodynamic forces on the fluid to reduce wall friction.

With the above and other objects in view, as will, hereinafter appear, a feature of the invention is the provision of a fluid conduit for flowing electrically conducting fluids. The conduit comprises an electrically conducting pipe, an electrically conducting rod extending axially through the pipe and centrally of the pipe, and a first power source in electrical communication with the pipe and the rod. The conduit further includes a solenodidal electromagnet disposed around the pipe, and a second power source in electrical communication with the electromagnet. Activation of the first and second power sources effects span-wise flow in the pipe with consequent reduction in wall friction in the pipe.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein.

DESCRIPTION OF THE PREFERRED EMBODIMENT

Figure 1:
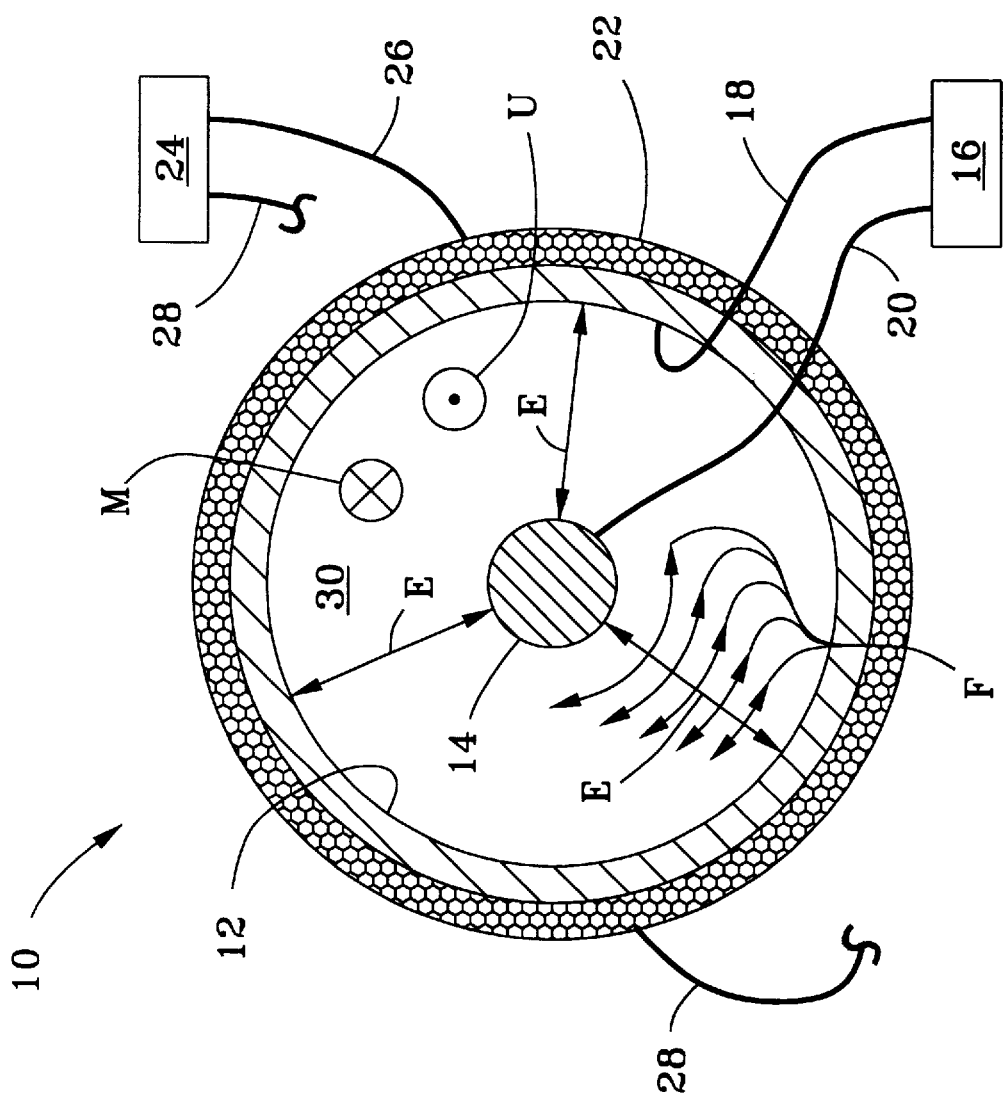
FIG. 1 is a diagrammatic width-wise cross-sectional view of a fluid conduit illustrative of an embodiment of the invention.

Referring to the drawings, it will be seen that the fluid conduit 10 of the present invention includes an electrically conducting pipe 12 and an electrically conducting rod 14 extending axially and centrally through the pipe 12. A first power source 16 (FIG. 1) is in electrical communication with the pipe 12 and the rod 14 by way of power leads 18,20.

The fluid conduit 10 further includes a solenoidal electromagnet 22 disposed on and around the pipe 12. A second power source 24 (FIG. 1) is in electrical communication with the electromagnet 22 by way of power leads 26, 28.

Figure 2:
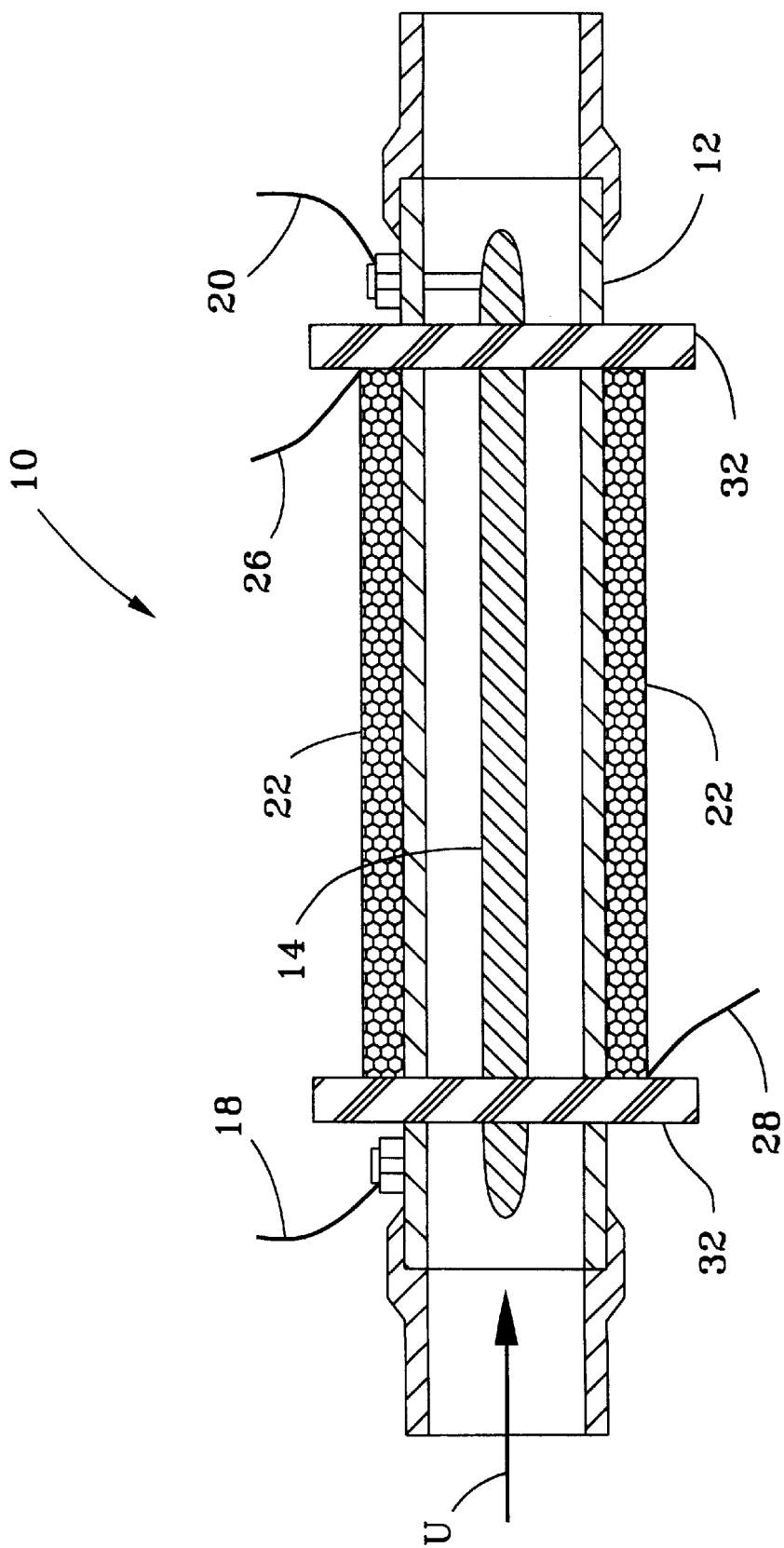
FIG. 2 is a length-wise cross-sectional view of the fluid conduit of FIG. 1.

The pipe 12 and 14 serve as electrodes. The first power source 16 preferably is an AC power supply. The second power source 24 preferably is a DC power supply. The pipe 12 and rod 14 defines therebetween an annular flow passageway 30. Nonconductive supports 32 (FIG. 2) are provided for rod 14 which allows for passage of flow U and may also serve to support conduit 10.

In operation, activation of the DC second power source 24 causes the electromagnet 22 to establish a magnetic field M which extends axially and uniformly through the pipe 12, and activation of the AC first power source 16 causes the pipe 12 and rod 14 to generate an alternating radial electric field E (FIG. 1). The vector cross product of the electric field E and the magnetic field M creates a circumferentially directed force F alternating between clockwise and counterclockwise force as the electric field E is alternated. Such circumferentially directed force F is normal to the mean flow U along the surfaces of the pipe 12 and rod 14 and serves to disturb the otherwise turbulent flow field in a fully developed flow to reduce the flow friction. Unlike the Nosenchuck et al. device, which applies forces normal to the surface, the circumferential perturbations applied to the turbulent boundary layers destroy streamwise vorticity, which is largely responsible for the flow friction within the conduit.

While it is preferred that the first power source be an AC power supply and the second power source be a DC power supply, some benefit may be gained wherein both power supplies are DC, and both are AC. Additionally, the electromagnet 22 may be replaced with a permanent magnet, thus eliminating second power source 24. However, such a system would not provide the level of control of the electromagnet embodiment.

There is thus provided a conduit having facility for exercising span-wise forces on the fluid flowing therein to reduce wall friction. The conduit of the present invention provides a simple device having no mechanical oscillations or moving parts.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A fluid conduit for flowing electrically conductive fluids, said conduit comprising:
   an electrically conducting pipe;
   an electrically conducting rod extending axially through said pipe and centrally of said pipe;
   a first power source in electrical communication with said pipe and said rod; and
   a magnetic means disposed around said pipe to create a magnetic field within said pipe, activation of said first power source creating an electric field within said pipe interacting with said magnetic field to effect flow in said pipe with consequent reduction in wall-friction in said pipe.

2. The fluid conduit in accordance with claim 1 wherein said first power source comprises an AC power supply.

3. The fluid conduit in accordance with claim 2 wherein said pipe and said rod define an annular flow path through said conduit.

4. The fluid conduit in accordance with claim 3 wherein said magnetic means is fixed on said pipe.

5. The fluid conduit in accordance with claim 1 further comprising a second power source in electrical communication with said magnetic means, said magnetic means being an electromagnet.

6. The fluid conduit in accordance with claim 5 wherein said second power source comprises a DC power supply.

7. The fluid conduit in accordance with claim 5 wherein said first power source comprises an AC power supply.

8. The fluid conduit in accordance with claim 7 wherein said second power source comprises a DC power supply.

9. The fluid conduit in accordance of claim 5 wherein said pipe and said rod define an annular flow path through said conduit.

10. The fluid conduit in accordance with claim 5 wherein said electromagnets is fixed on said pipe.

* * * * *